UNITED STATES PATENT OFFICE.

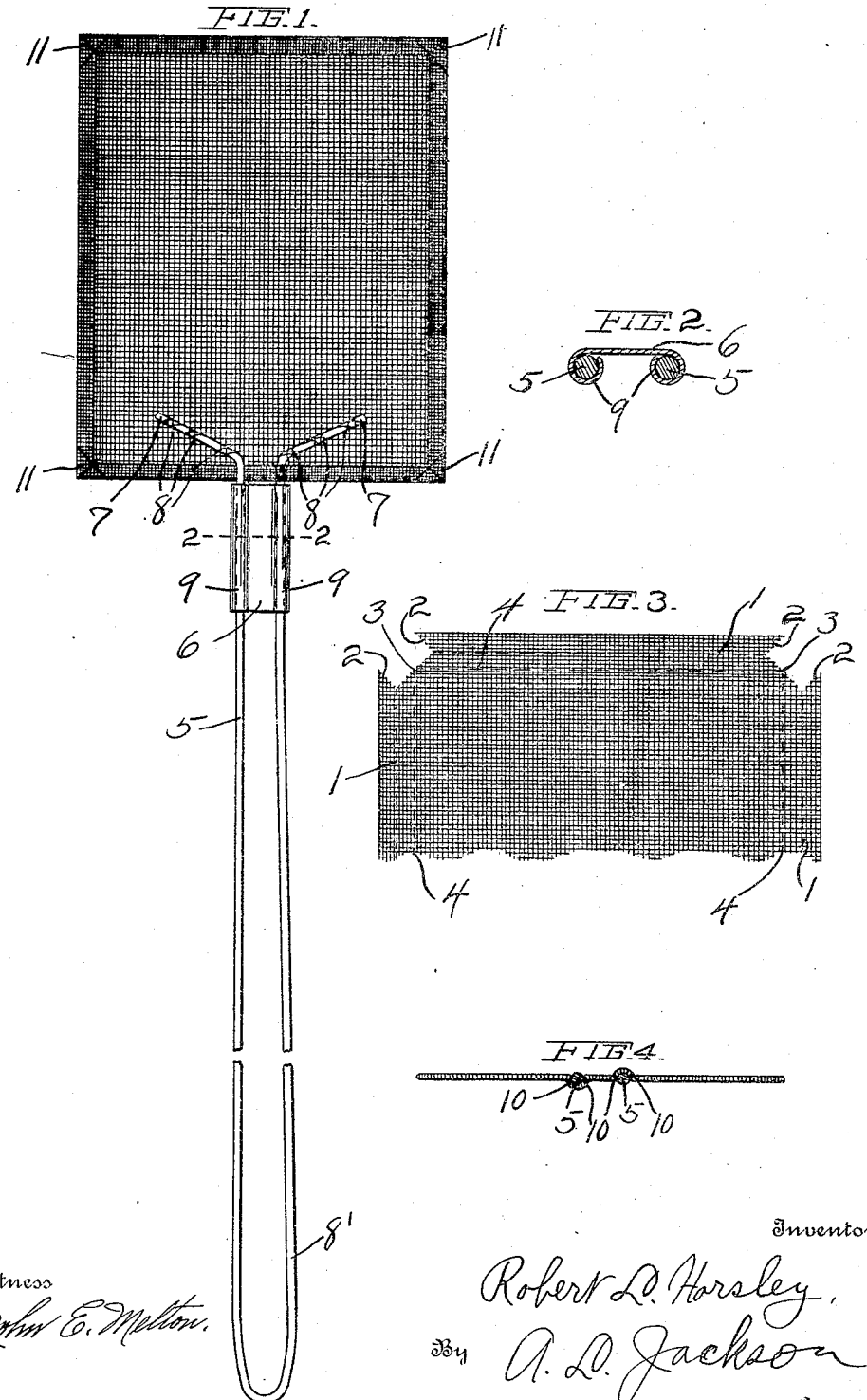

ROBERT L. HORSLEY, OF MEMPHIS, TENNESSEE, ASSIGNOR TO COMPRESS BUCKLE COMPANY, OF FORT WORTH, TEXAS, A CORPORATION OF TEXAS.

INSECT-SWATTER.

1,290,998.

Specification of Letters Patent. Patented Jan. 14, 1919.

Application filed May 13, 1918. Serial No. 234,040.

*To all whom it may concern:*

Be it known that I, ROBERT L. HORSLEY, a citizen of the United States of America, residing at Memphis, in the county of Shelby and State of Tennessee, have invented certain new and useful Improvements in Insect-Swatters, of which the following is a specification.

My invention relates to insect destroyers and particularly to a handy device for swatting flies and other insects; and the object is to provide convenient and relatively inexpensive devices for destroying insects and which will be durable. One of the defects in such devices heretofore provided is that they soon break to pieces or wear out or break from the handles. One object of this invention is to provide devices with handles which can be quickly attached to the swatters and which will not break the connections with the wire mesh and from which the handles can be easily and quickly detached. Other objects and advantages will be fully explained in the following description and the invention will be more particularly pointed out in the claims.

Reference is had to the accompanying drawings which form a part of this application.

Figure 1 is a plan view of the swatter. Fig. 2 is a cross-section of the handle and its clamp, taken on the line 2—2 of Fig. 1. Fig. 3 is a portion of a blank as it is prepared to form the swatter. Fig. 4 is a view of the inner end of the body portion, the handle being shown in section.

Similar characters of reference are used to indicate the same parts throughout the several views.

The improved swatter is prepared by cutting a piece of wire mesh in rectangular form to make a body 12 or any other desirable form and then cutting out a portion of each corner as shown in Fig. 3. The wire is first folded along the dotted lines 1. This will bring the edges 2 along in line with edges 3. After the folds are pressed flat, the edges are again folded along the lines 4 and pressed flat. The swatter will then appear as shown in Fig. 1 and have no bunglesome corners.

The handle is formed of a single piece of wire 5 and a clamp 6. The handle has holding members 7 which are bent at such angles as may be necessary to keep from breaking the wire mesh. One side of the handle is placed on one side of the swatter and the other side of the handle is placed on the other side of the swatter. Loops 8 are formed of the wire mesh itself, being pressed in the wire mesh without breaking the wire mesh for receiving the members 7. The clamp 6 is placed near the end 8' of the handle. The members 7 can then be easily threaded into the loops 8 to the position shown in Fig. 1. The clamp or clip 6 is then shoved to the position shown in Fig. 1 for clamping the members 7 in place. The parts 9 of the clamp may be pressed on the rods or wires 5 if necessary to prevent the clamp from slipping. Various changes may be made in the construction and arrangement of parts without departing from my invention.

After the rim has been formed with the folds above set forth, the corners 11 may be dipped into melted lead or shellac or some substance which will be quickly solidified or crystallized in the wire mesh for holding the rim fixedly.

After the members 7 are threaded in the loops 8, the rim and body 12 of the wire mesh may be pressed about the handle members 5 to form shoulders 10 as additional means to hold the members 7 in place.

What I claim, is,—

1. An insect swatter comprising a body of wire mesh said body having loops formed of the wire mesh of the body and pressed out of the plane of the body, said mesh being folded at the edges and having the folded portions at the corners filled with a holding material to prevent accidental unfolding, and a handle having holding members threaded into said loops, said body forming shoulders to prevent removal of the holding members from said loops.

2. An insect swatter comprising a netted body having loops formed from the mesh thereof and pressed out of the plane of the body and a handle composed of a single wire bent and provided with holding members threaded into said loops and a clamp securing said holding members in place.

3. An insect swatter comprising a body of wire mesh and a handle composed of a single wire bent to provide substantially parallel members terminating with holding members bent at angles to said parallel members, said body having loops formed from the mesh and pressed out of the plane of the body and said holding members being threaded into said loops, and a clamp having the edges curved about said parallel for securing said holding members in place.

4. An insect swatter comprising a body of wire mesh having the edges folded to form a rim about the body and having loops formed of the mesh of the body and pressed out of the plane of the body, holding material embedded in the wire mesh of the folds for securing said folds, and a handle having holding members at angles to the handle and threaded into said loops.

5. An insect swatter comprising a netted body having a rim and a handle consisting of a single piece of wire bent to form substantially parallel members and holding members at angles thereto and having terminals bent at angles to said parallel members, said body having loops formed from the mesh and pressed out of the plane of the body and said holding members being threaded into said loops, the rim being pressed about said handle members to prevent premature removal of said holding members.

In testimony whereof, I set my hand, this 13th day of April, 1918.

ROBERT L. HORSLEY.

Copies of this patent may be obtained for five cents each, by addressing the "Commissioner of Patents, Washington, D. C."